Patented Nov. 17, 1942

2,302,466

UNITED STATES PATENT OFFICE 2,302,466

PROCESS OF OXIDIZING CYMENES

Robert C. Palmer and Carlisle H. Bibb, Pensacola, Fla., assignors to Newport Industries, Inc., Pensacola, Fla., a corporation of Delaware No Drawing. Application March 19, 1941, Serial No. 384,094

3 Claims. (Cl. 260—592)

This invention relates to a process of oxidizing cymenes and to products produced thereby, particularly mixtures of tertiary alcohols and ketones, such as dimethyl tolyl carbinol and p-methyl acetophenone. Such mixtures are useful for their solvent and wetting properties, which are, in general, similar to those of pine oil.

In our copending application, Serial No. 303,026, filed November 6, 1939, entitled "Process of preparing cumic acid," of which the present is a continuation-in-part, we have described and claimed the catalytic oxidation of a cymene to produce cumic acid. The present application is directed more particularly to the recovery of a mixture of tertiary alcohols and ketones, substantially free from cumic and other acids, the acids being suitably removed from the oxidation reaction mass as by washing with an aqueous alkali solution.

It is therefore an important object of this invention to provide an efficient process for the conversion of a cymene, by catalytic oxidation in liquid phase, into a mixture of acids, tertiary alcohols and ketones, and the recovery of the alcohols and ketones in admixture, relatively free from acids and unreacted cymenes.

It is a further important object of this invention to provide as a novel composition of matter a mixture of tertiary alcohols and ketones, particularly of dimethyl tolyl carbinol and p-methyl acetophenone, having useful solvent and wetting properties.

Other and further important objects of this invention will become apparent from the following description and appended claims.

The catalysts that we have found to be most satisfactory for our purpose are the oxygen containing compounds of the so-called heavy metals, particularly of such metals as manganese, lead, cobalt, iron, nickel, copper, vanadium, chromium and mercury. The oxides, hydroxides, or organic salts of any of these metals, or combinations thereof, may be employed. For instance, heavy metal compounds of any of the acids, such as acetic acid, belonging to the lower fatty acid series, have been found suitable. It is also satisfactory to start with the cumates of the heavy metals, or the cumates may be formed during the reaction if one starts with a heavy metal salt of an acid weaker than cumic acid. Mixtures of lead and manganese compounds give the optimum catalytic action.

The following will serve as an example of one method of preparing a preferred catalyst comprising a mixture of lead and manganese acetate:

A mixture of manganese acetate containing 4 mols of water with lead acetate containing 3 mols of water is intimately ground and fused at about 130° C., until the product becomes anhydrous and solid. The mixture should be held at this temperature, preferably, until a slight brown discoloration appears. The solid mixture is then cooled in a dry atmosphere and ground to a fine powder. The catalytic activity of the mixture is not critical as regards the proportion of manganese to lead, but 2 parts of manganese acetate to 1 part of lead acetate have been found to be very satisfactory.

The following example will serve to illustrate a preferred embodiment of our process for preparing a mixture of dimethyl tolyl carbinol and methyl acetophenone from p-cymene:

200 gallons of p-cymene are placed in a suitable vessel equipped with heating, cooling and agitating means, as well as with a pipe or conduit leading down into the body of the p-cymene for the introduction of air thereinto. 30 lbs., corresponding roughly with 2% by weight, of a catalyst, such as the mixture of lead and manganese acetate above described, are added and the temperature raised to about 45° C., where it is held for about 2 hours. Air is introduced into the charge of p-cymene at the rate of about 17 cu. ft. per minute, while at the same time agitating the charge vigorously. After the 2 hour period, the temperature can be brought down to 30° C. and the process continued for an additional period of about 72 hours. The degree of oxidation taking place can be followed by determining the specific gravity of the product. The specific gravity may, for instance, be allowed to increase from 0.861 for p-cymene itself, to 0.994 for a mixture of cymene, cumic acid, dimethyl tolyl carbinol, p-methyl acetophenone and minor proportions of aldehydes and oxides. At the latter specific gravity, the crude oxidized cymene reaction mass will usually contain around 20% of its weight as cumic acid, the balance being largely a mixture of dimethyl tolyl carbinol and p-methyl acetophenone, together with unreacted cymene.

We have observed that during the course of the oxidation reaction, there is a tendency toward the formation of peroxide-like bodies which would undoubtedly decompose with explosive violence when heated under conditions suitable for distillation. In order to remove these peroxide-like bodies, after the completion of the oxidation stage, the air is turned off and the temperature of the charge in the still is advanced to around 125 to 140° C. and maintained at that temperature by circulation of cold water, if necessary, through the jacket of the still. Decomposition of the thermally decomposable oxygen containing compounds takes place rapidly at the temperature indicated, but by providing ample vacuum capacity and by circulating cooling water through the jacket of the still, the rate of evolution of non-condensible gases can be satisfactorily controlled so as to prevent substantial loss of vacuum and consequent rise in the boiling temperature of the charge in the still.

The resulting crude reaction mass, freed from peroxide-like bodies and having a volume of about 190 gallons, is next washed once with a slight excess of dilute hydrochloric acid, as for instance, an amount of 6% hydrochloric acid sufficient to react with the metal compounds present and to effect their removal from the crude reaction mass. This step is preferred, but not essential, for the purpose of putting the resulting crude reaction mass in a condition which will not cause emulsions to persist when it is subsequently washed with an aqueous alkali solution to separate the cumic acid.

The crude reaction mass is then given a water wash of about 200 gallons to remove the remaining chlorides. It is finally washed once with a slight excess (based on the acid content) of a 6% solution of sodium hydroxide, or other equivalent alkali solution, to remove the cumic acid as the alkali metal salt. The aqueous alkali extract is acidified with hydrochloric acid, or other suitable acid, to precipitate the cumic acid in crude form for subsequent filtering or decanting operations.

After the removal of the acid by the foregoing alkali wash, the mixture of tertiary alcohols and ketones, particularly dimethyl tolyl carbinol and p-methyl acetophenone, and unreacted cymene, is subjected to fractional distillation under a relatively high vacuum. For instance, the mixture may be charged into a jacketed still and the charge in the still heated by steam in the jacket to about 100° C., while drawing a vacuum of around 20 to 30 mm. of mercury, absolute pressure, on the still. These conditions of temperature and vacuum are maintained until practically all of the hydrocarbons have been distilled off. The pressure is then dropped to around 5 to 10 mm. to take off a cut consisting largely of the dimethyl tolyl carbinol and methyl acetophenone. The proper boiling range for the cut will, of course, depend upon the degree of vacuum, and since the degree of vacuum may vary considerably within the still, it is impossible to give any specific directions. At a vacuum of 1 mm. of mercury, absolute pressure, for instance, the boiling range may be between 77 and 89° C.

The composition of the cut so separated will, in general, run between 60 and 90% of tertiary alcohols, principally dimethyl tolyl carbinol, and between 40 and 10% of ketones, mostly methyl acetophenone. A preferred composition is between 75 and 85% of dimethyl tolyl carbinol and between 25 and 15% of methyl acetophenone, with traces of aldehydes and oxides.

The proportion of carbinol to ketone can be varied by controlling the degree of oxidation effected. For example, if the oxidation is carried further to use up more of the cymene, the proportion of ketone to carbinol in the mixture increases. The control of the extent of oxidation thus provides a method of obtaining the desired proportion of carbinol to ketone. Since the carbinol and ketone are not separable by distillation, this control affords the most satisfactory means of varying the proportions of the main constituents of the mixture.

Within the range of compositions above given, the refractive index at 20° C. will lie between 1.51 and 1.53, with 1.5200 as typical of the preferred composition. The specific gravity at 15.5/4° C. for the composition within the broader ranges and proportions of dimethyl tolyl carbinol and methyl acetophenone will lie between 0.96 and 1.00, with 0.9823 as typical of the preferred composition.

The time of oxidation can be considerably reduced if a small quantity, such as 10%, of the crude oxidation reaction mass of a previous run is added to a new batch to be oxidized. This assists in the activation of the catalyst, which, even at ordinary room temperatures, may become so active that with good agitation practically all of the oxygen of the air used is consumed in a single pass. Furthermore, the addition of some of a previous crude reaction mass to a new batch causes the reaction to take place rapidly at the lowest temperature. It is possible, although this is not well understood, that such unusual catalytic activity is associated with the presence of cumic acid, which may combine with the metal salts to form complex oxy-cumates or other compounds which are more soluble or more easily dispersed than the acetates.

The temperature of oxidation may be varied either way from the 30° C. specified in the foregoing example. At temperatures much below 30° C., the rate of oxidation becomes impracticably low. At temperatures above 30° C., the rate of the reaction becomes greater, but temperatures below 50° C. are preferred.

The cymene used as the starting material does not have to be pure p-cymene, but a similar process starting with a mixture of p-cymene and p-menthane, using optionally higher temperatures, is described and claimed in our copending application entitled "Process of Oxidizing Cymene and P-Menthane and Products Therefrom", filed of even date herewith.

The extent to which the oxidation is carried in any given batch may be varied over a considerable range, by controlling the rate of introduction of oxygen or the time of such introduction. If a smaller proportion of the cymene is converted into its oxidation product, then more cymene may be recovered for reoxidation in a subsequent run. Alternatively, the oxidation may be continued until practically no cymene remains unconsumed.

The proportion of catalyst used may be varied, depending upon whether or not it is desired to speed up or slow down the rate of oxidation. From a practical standpoint, however, the proportion of catalyst will, in general, lie within the range of from 0.1 to 5% of the weight of the charge.

Other methods of contacting air, or molecular oxygen, with the cymene in the presence of an oxidizing catalyst are also effective in producing the desired mixture of tertiary alcohols and ketones. For example, the cymene may be sprayed into air and allowed to collect, the air replaced and the product resprayed until it is sufficiently oxidized. Alternatively, the cymene and catalyst may be caused to flow down through a partially filled or packed tower, up through which a stream of air is passed. So long as air, or molecular oxygen, is brought into intimate contact with the cymene and catalyst, oxidation is effected. For the purposes of this specification and claims, air and oxygen are considered equivalents and are herein referred to generically as molecular oxygen.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The process of oxidizing a cymene to recover a mixture of alcohols and ketones therefrom, which comprises subjecting a cymene in liquid phase to the action of molecular oxygen in the presence of an oxidation catalyst selected from the group consisting of oxides, hydroxides, and carboxylic acid salts of heavy metals at a temperature below 50° C. until a substantial proportion of the cymene has been converted into a mixture of acids, alcohols, and ketones, removing the acids, fractionally distilling the remaining mixture to separate unreacted cymene from the alcohols and ketones, and recovering the alcohols and ketones in admixture substantially free from said acids and unreacted cymene.

2. The process of oxidizing a cymene to recover a mixture of alcohols and ketones therefrom, which comprises subjecting a cymene in liquid phase to the action of molecular oxygen in the presence of an oxidation catalyst comprising both lead and manganese compounds selected from the group consisting of oxides, hydroxides, and carboxylic acid salts of said metals at a temperature below about 50° C. until a substantial proportion of the cymene has been converted into a mixture of acids, alcohols, and ketones, removing said acids, fractionally distilling the remaining mixture under high vacuum, and recovering the alcohols and ketones in admixture substantially free from said acids.

3. The process of converting p-cymene into a mixture of dimethyl tolyl carbinol and p-methyl acetophenone, which comprises subjecting p-cymene in liquid phase to the action of molecular oxygen in the presence of an oxidation catalyst containing heavy metal compounds selected from the group consisting of oxides, hydroxides, and carboxylic acid salts of said heavy metals at a temperature not over 50° C. until a substantial conversion of the p-cymene into a reaction mass containing acids, alcohols, and ketones has been effected, removing the acids from said reaction mass, and distilling the remaining reaction mass to separate unreacted cymene and recover a mixture of dimethyl tolyl carbinol and p-methyl acetophenone relatively free from acids.

ROBERT C. PALMER.
CARLISLE H. BIBB.